US012340406B2

(12) United States Patent
Dodds et al.

(10) Patent No.: US 12,340,406 B2
(45) Date of Patent: Jun. 24, 2025

(54) COMBINING VECTORS OUTPUT BY MULTIPLE DIFFERENT MECHANISMS FOR CONTENT ITEM RETRIEVAL

(71) Applicant: Yahoo Ad Tech LLC, Wilmington, DE (US)

(72) Inventors: Eric McVoy Dodds, Berkeley, CA (US); Benjamin Jackson Culpepper, Berkeley, CA (US); Gaurav Srivastava, San Francisco, CA (US)

(73) Assignee: Yahoo Ad Tech LLC, New York, NY (US)

( * ) Notice: Subject to any disclaimer, the term of this patent is extended or adjusted under 35 U.S.C. 154(b) by 327 days.

(21) Appl. No.: 17/875,484

(22) Filed: Jul. 28, 2022

(65) Prior Publication Data

US 2024/0037627 A1 Feb. 1, 2024

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0603* (2013.01); *G06Q 30/0643* (2013.01)

(58) Field of Classification Search
CPC .................................................. G06Q 30/0627
See application file for complete search history.

(56) References Cited

U.S. PATENT DOCUMENTS

| | | | | |
|---|---|---|---|---|
| 6,553,357 | B2 * | 4/2003 | Mathias | G06N 3/086 706/15 |
| 6,954,721 | B2 * | 10/2005 | Webber | G06F 17/15 375/343 |
| 9,082,148 | B1 * | 7/2015 | Oczkowski | G06Q 30/0601 |
| 9,152,624 | B1 * | 10/2015 | Krallman | G06F 16/00 |
| 11,200,740 | B1 * | 12/2021 | Samuel | G06F 3/0485 |
| 11,620,448 | B2 * | 4/2023 | Suhara | G06F 40/30 704/9 |
| 2020/0201915 | A1 * | 6/2020 | Pathak | G06N 3/084 |
| 2021/0049664 | A1 * | 2/2021 | Lundgaard | G06F 16/90344 |

OTHER PUBLICATIONS

Vivek Phuloria "Neural Networks Explained—Deep Learning 101" Towards Data Science Jun. 15, 2020. Retrieved from https://towardsdatascience.com/deep-learning-101-neural-networks-explained-9fee25e8ccd3#:~: text=Hence%20Neural%20Networks%20are%20also,results%20that%20they%20are%20getting. (Year: 2020).*
Vo, Nam, et al. "Composing text and image for image retrieval-an empirical odyssey." Proceedings of the IEEE/CVF conference on computer vision and pattern recognition. 2019.*

* cited by examiner

*Primary Examiner* — Kathleen Palavecino
(74) *Attorney, Agent, or Firm* — Cooper Legal Group LLC

(57) ABSTRACT

One or more systems and/or methods for combining vectors output by multiple different mechanisms for content item retrieval are provided. An image encoder may output a first set of vectors generated by an image model using an input image as input. A text encoder may output a second set of vectors generated by a text model using input text as input. A vector combination module may combine the first set of vectors and the second set of vectors to create a vector output. A weight is applied to the vector output to create a weighted output. An output vector is generated based upon a combination of the first set of vectors, the second set of vectors, and the weighted output. The output vector is used to query a catalog to identify a content item related to the input image and the input text.

20 Claims, 9 Drawing Sheets

COMBINING VECTORS OUTPUT BY MULTIPLE DIFFERENT MECHANISMS FOR CONTENT ITEM RETRIEVAL

BACKGROUND

Many users of computing devices access and view visual content that includes images and photos. For example, a news platform may provide computing devices with access to articles and/or other content that includes images and photos related to the articles and content. These articles and/or other content may be displayed through a website, an application, or other user interface. These images may depict various types of products that may be of interest to a user accessing the content. The user may have an interest in similar products that may vary in some manner, such as a shirt in a different size, a different color, or a different style.

SUMMARY

In accordance with the present disclosure, one or more computing devices and/or methods for combining vectors output by multiple different mechanisms for content item retrieval are provided. A catalog of content items may be available to display through user interfaces on computing devices, such as through a website, an application, as a recommendation, etc. The catalog includes images paired with written descriptions of products, such as clothing, jewelry, cars, furniture, shoes, etc. Certain users may have an interest in the products depicted by these content items. Accordingly, content items that may be of interest to a user may be identified utilizing an image representation that can be modified by subtracting the representation of a phrase in natural language that describes the desired visual difference in the image. Various encoders, modules, and models implementing machine learning algorithms such as deep neural network models with attention and modality fusion mechanisms are used to obtain these representations. The vectors output by the encoders are combined in a manner that improves the accuracy of ranking and/or selecting content items of interest to provide to users. Also, the encoders, modules, and models are trained more efficiently so that less compute resources are required to achieve a desired performance, and require a smaller amount of training data for a desired level of performance. This reduces computing resources consumed during training. Residual attention fusion leverages an initial model trained on a large scale dataset by fine-tuning (e.g., further training) a residual attention fusion enhanced model on more specialized data (e.g., by performing transfer learning).

A content item may be identified as corresponding to a product or other entity (e.g., a service, a location, a business, etc.) depicted by an image, which may differ by some modification (e.g., a dress that is longer than a depicted dress, a hat that is a different color that a depicted hat, a car that has a different number of doors, etc.). Thus, a user that has viewed or has some interest in the product or entity depicted by the image can be provided with a recommendation of the content item corresponding to the product or entity with some modification. In some embodiments of identifying the content item, an image encoder may output a first set of vectors generated by an image model using an image as input (e.g., an image of a car with 2 doors). A text encoder may output a second set of vectors generated by a text model using input text as input (e.g., a description of the car having the option of 4 doors). A vector combination module may combine the first set of vectors and the second set of vectors to create a vector output (e.g., an attention fusion model implemented by the vector combination module may create the vector output). A weight is applied to the vector output to create a weighted output (e.g., a value between 0 and 1). An output vector is generated based upon a combination of the first set of vectors, the second set of vectors, and the weighted output. The output vector may comprise values for characteristics of the car (e.g., a value for a number of doors, a color, a brand, a wheel size, a model, etc.), which can be used to identify similar content items (e.g., a content item with similar values for the characteristics). The output vector is used to query a catalog to identify a content item related to the input image and the input text, such as an image, a recommendation, or a link to a website regarding a 4 door variant of the car. In this way, the content item can be provided to the user, such as by being displayed on a display of a computing device.

In some embodiments, a model used by the techniques described herein is configured to output a vector for a query where the query is an image and associated text. The model can also output a vector for any content item (an image) in the catalog. For a given query (image and associated text), the model is used by the system to rank the content items in the catalog according to how close each content item's associated vector (e.g., a vector output by the model when a content item's image is input into the model) is to the query's associated vector (e.g., a vector output by the model when the query is the input). Without training, the rankings of how close the vectors are may be very inaccurate (e.g., noise). The training process described herein uses examples of pairs (query, content item from catalog) to adjust parameters of the model (e.g., using a method such as stochastic gradient descent on a softmax cross-entropy loss function) such that the rankings (e.g., of how closely vectors match for the pairs) reflect the examples (e.g., a content item would be ranked high for a query paired with the content item in an example). After training, the model can process previously-unseen content items in the catalog (e.g., content items not processed by the model) and queries in order to output rankings that reflect the types of relationships present in the training example pairs. Residual attention fusion (RAF) can be used for a model whose rankings are meaningful, and is used to improve the model through training. Accordingly, the techniques described herein (e.g., a vector combination module and/or a final output vector combination module) can utilize RAF to improve the model through training.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
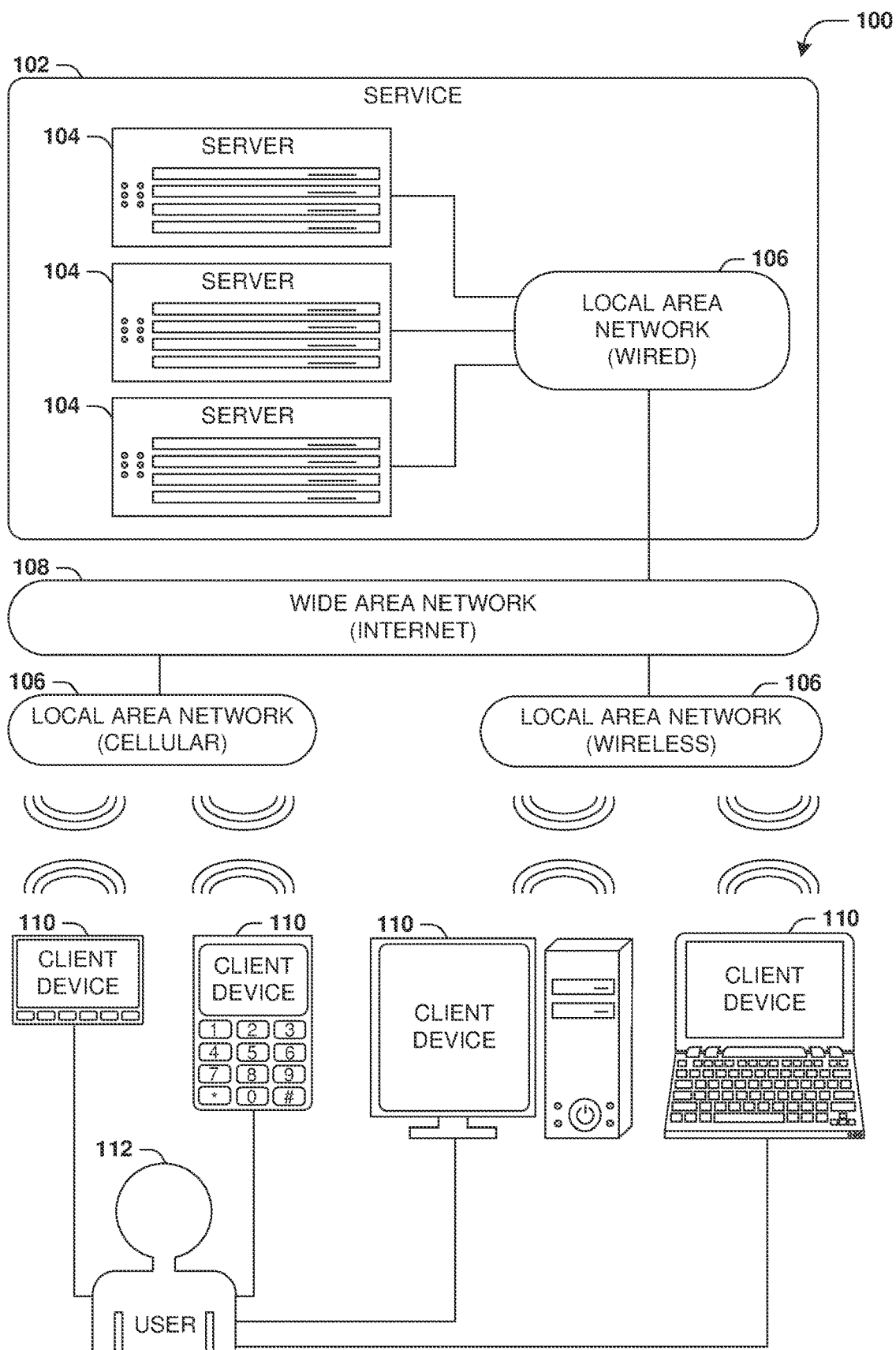
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
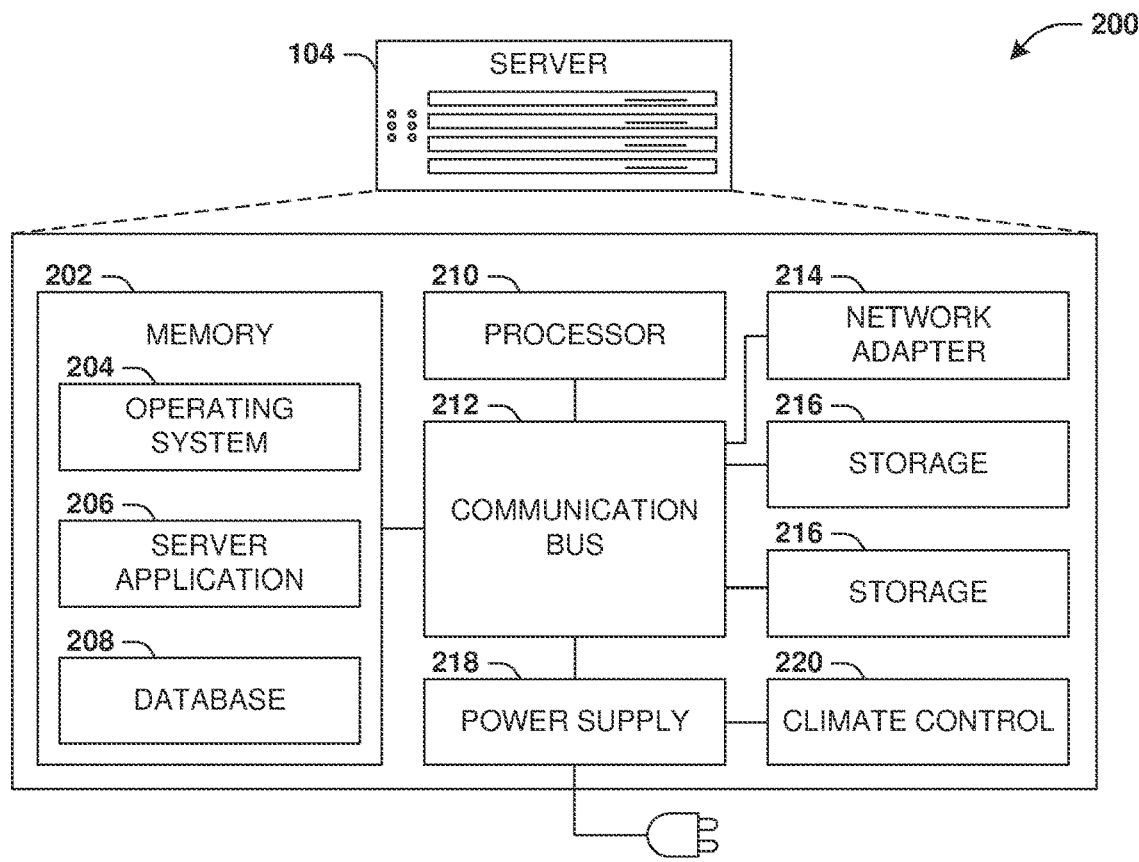
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
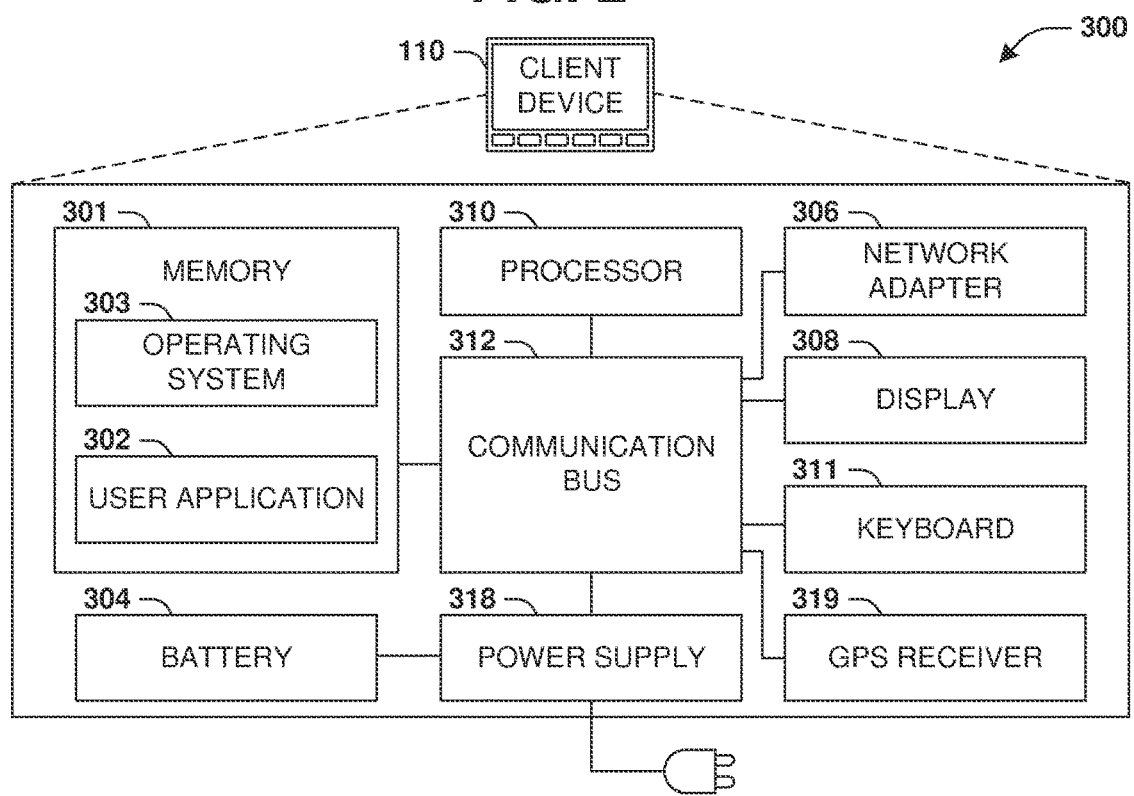
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for combining vectors output by multiple different mechanisms for content item retrieval are provided. Every day, millions of users consume visual content, such as articles with photos, images, and videos related to the content of the articles. These users may consume such content through various types of computing devices, such as mobile devices, tablets, laptops, videogame systems, smart devices, wearable devices, etc. The content may be accessed through websites, applications, or other types of user interfaces. The user's experience may be improved by recommending additional content items, such as content items depicting products from a catalog, which may be relevant and interesting to the user. An image depicting a product or other entity may be used as a query image for identifying content items depicting similar products or entities (e.g., an image of a watch with a red band). Text, such as a modifying caption (e.g., "with a blue band"), can be used with the query image to retrieve content items from the catalog (e.g., the watch or similar watches with blue bands).

Retrieving relevant content items from the catalog based on the query image together with the text (e.g., the modifying caption) is a challenging multimodal task that can benefit various domains of content items where fine details and subtle variations may be best expressed through natural language of the text (e.g., variations in products such as clothing). This innovation provides a modeling approach that achieves state-of-the-art performance. An evaluation dataset complements existing benchmarks by including relative captions as text with positive labels and negative labels of caption accuracy and condition image similarity. Conventional techniques are limited to positive labels with a combined meaning. This innovation provides for multimodal pre-training, and where domain-specific weak supervision based on attribute labels can augment generic large-scale pre-training. While conventional techniques lose benefits from multimodal pre-training, this innovation introduces a vector combination module (e.g., a residual attention fusion mechanism) that improves performance.

In some embodiments of this innovation, content items may be identified utilizing various encoders, modules, and models implementing machine learning algorithms such as deep neural network models. The vectors output by the encoders are combined in a manner that improves the performance of the encoders, modules, and models and the accuracy of the vectors being output and used to identify content items of interest to users. Also, the encoders, modules, and models are trained more efficiently so that less compute resources are required to achieve a desired performance, and can perform better with a smaller amount of required training data for a desired amount of performance.

Figure 4:
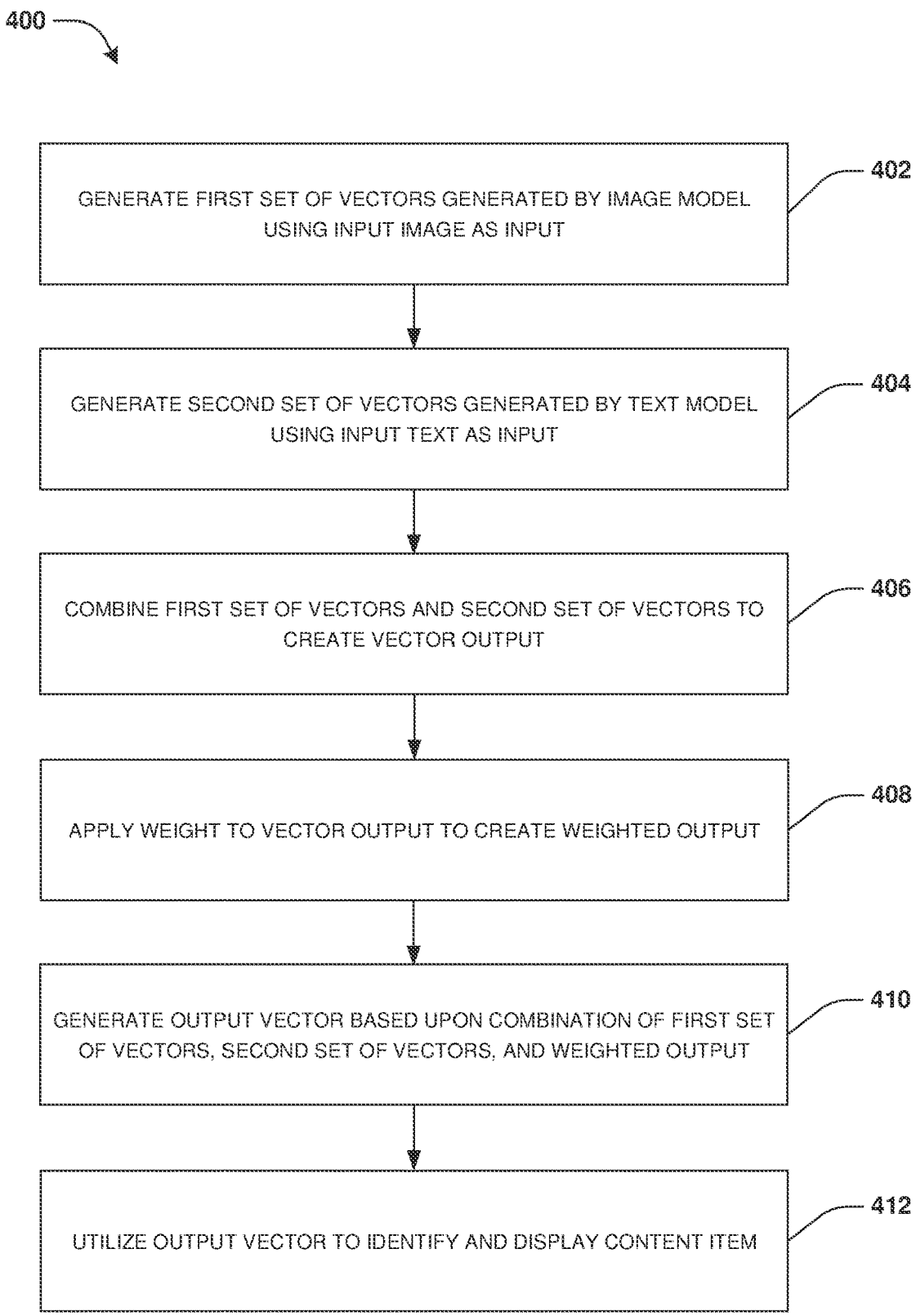
FIG. 4 is a flow chart illustrating an example method for combining vectors output by multiple different mechanisms for content item retrieval.
Figure 5A:
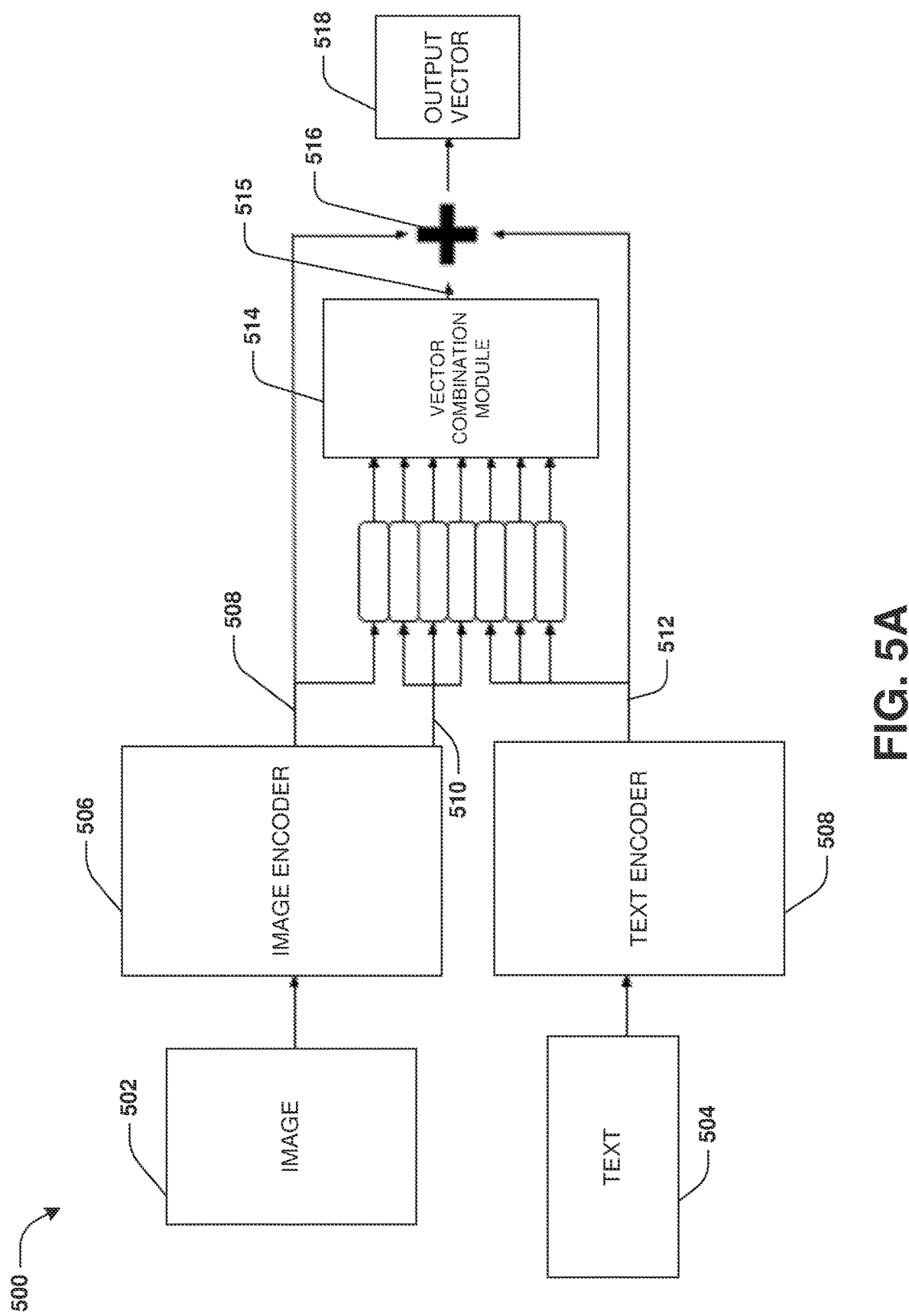
FIG. 5A is a component block diagram illustrating an example system for combining vectors output by multiple different mechanisms for content item retrieval.
Figure 5B:
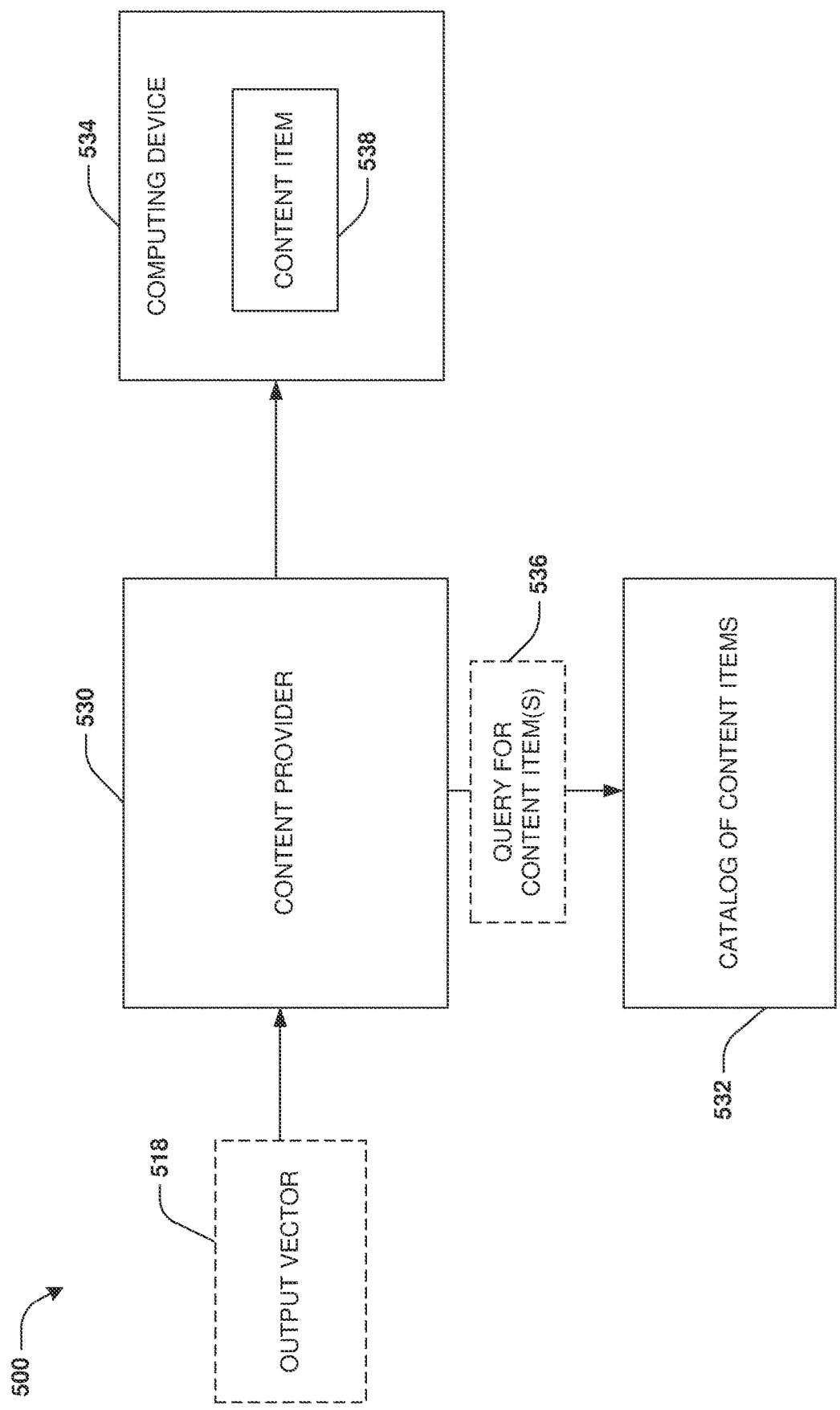
FIG. 5B is a component block diagram illustrating an example system for combining vectors output by multiple different mechanisms for content item retrieval.

One embodiment of combining vectors output by multiple different mechanisms for content item retrieval is illustrated by an exemplary method 400 of FIG. 4 and is further described in conjunction with system 500 of FIGS. 5A and 5B. The method 400 and system 500 are implemented to train and utilize models for text-guided content item (image) retrieval from a catalog 532 of content items, illustrated by FIG. 5B. The catalog 532 may be populated with content items, such as images depicting products (e.g., watches, cars, clothing, merchandise, etc.), entities (e.g., a sports team logo), houses, and/or a variety of other objects or things. Content items may be selected from the catalog 532 by a content provider 530 so that the content provider 530 can provide particular content items to a computing device 534 for display to a user that may have interest in the content items. The content items may be displayed through a website, an email, a text message, a recommendation, an app, etc. Various encoders, modules, and models are implemented in order to select certain content items to provide.

In some embodiments, an image encoder 506 is used to process input images using image models (e.g., a deep neural network model) that output vectors that are representative of features of the input images, as illustrated by FIG. 5A. In particular, an image model may be used by the image encoder 506 to map input pixels of an input image to dimensions of an output vector. An output vector from the image model may comprise dimensions that are 512 floating point numbers, for example. The image model is trained so that the output vector can be compared with other output vectors (e.g., an output vector from a text model) so that a distance between the output vectors can be determined in order to identify relationships between what was input into the models (e.g., an input image for the image model and a text input for the text model) for generating the output vectors, such as a relationship between what an input image depicts and a description/caption for the input image.

In some embodiments, a text encoder 508 is used to process input text using text models (e.g., a deep neural network model) that output vectors that are representative of features of the input text. In particular, a text model may be used by the text encoder 508 to map input text characters of input text (e.g., tokens) to dimensions of an output vector. Each dimension may represent a particular feature (e.g., color, shape, size, shorts, shirts, shoes, etc.). The text model is trained so that the output vector can be compared with other output vectors (e.g., an output vector from an image model) so that a distance between the output vectors can be determined in order to identify relationships between what was input into the models (e.g., an input image for the image model and a text input for the text model) for generating the output vectors, such as a relationship between what an input image depicts and a description/caption for the input image.

In some embodiments, the image encoder 506 and the text encoder 508 are executed to process an input image 502 and input text 504 relating to the input image 502. In an example, the input image 502 may depict a product, an entity, an object, a service, a logo, a building, or anything else. The input text 504 may comprise a description, caption, or other text relating to what is depicted by the input image 502. In an example, the input text 504 may describe a modification/variation/option to what is depicted, such as a different color, size, shape, etc. (e.g., a bike with different mud tires, the bike with different handle bars, etc.). In an example, the input image 502 corresponds to a first product (e.g., the bike with road tires), the input text 504 corresponds to a description related to the first product (e.g., how the bike can optionally be ordered with mud tires), and the input image 502 and the input text 504 can be used to identify a second product to suggest to a user (e.g., a recommendation of the bike with mud tires). Thus, the description of the input text 504 corresponds to a modification of the first product, and the second product relates to the modification of the first product.

During operation 402 of the method 400, the image encoder 506 takes the input image 502 as input for an image model (e.g., a deep neural network model or other type of model) to process. The image model of the image encoder 506 generates a first set of vectors based upon the input image 502. The first set of vectors may comprise a vector 508 that is a final output from the image model. The first set of vectors may include one or more intermediary vectors 510 generated by the image model during processing of the input image 502 in order to generate the vector 508 as the final output of the image model. The first set of vectors includes vectors with certain dimensionality where each dimension may correspond to a particular feature/property/characteristic and has a value indicative of how much the input image 502 corresponds to that dimension (e.g., a blue color dimension may have a small value if the input image 502 has little to no blue color; a red color dimension may have a larger value if the input image 502 has a lot of red color; etc.). In some embodiments, the image model may map input pixels of the input image 502 to dimensions of the first set of vectors.

The first set of vectors, such as the vector 508 and the one or more intermediary vectors 510, is used as input for a vector combination module 514. In some embodiments, the dimensionality of the vector 508 is different from the dimensionality of the one or more intermediary vectors 510. Accordingly, a matrix of learned parameters are applied to the one or more intermediary vectors 510 in order to modify (e.g., add additional dimensions) the dimensionality of the one or more intermediary vectors 510 to match the dimensionality of the vector 508. The vector 508 (e.g., but not the one or more intermediary vectors 510) is also used as input for a final output vector combination module 516 whose operation will be subsequently discussed in detail.

During operation 404 of the method 400, the text encoder 508 takes the input text 504 as input for a text model (e.g., a deep neural network model or other type of model) to process. The text model of the text encoder 508 generates a second set of vectors 512 based upon the input text 504. The second set of vectors may comprise vectors generated from tokens derived from the input text 504. The tokens may correspond to one or more characters, one or more words, or one or more strings extracted or derived from the input text 504. The second set of vectors 512 includes vectors with certain dimensionality where each dimension may correspond to a particular feature/property/characteristic and has a value indicative of how much the input text 504 (e.g., a particular token) corresponds to that dimension (e.g., a blue color dimension may have a small value if the input text 504 or token does not comprise characters, words, or strings corresponding to colors or shades of blue; a red color dimension may have a larger value if the input text 504 or token comprises characters, words, or strings corresponding to colors or shades of red; etc.). In some embodiments, the text model may map strings of text characters (tokens) of the input text 504 to dimensions of the second set of vectors 512.

The second set of vectors 514 are used as input for the vector combination module 514. The second set of vectors 513 (or a single final/total output vector from the text model) is also used as input for the final output vector combination module 516 whose operation will be subsequently discussed in detail.

In this way, the first set of vectors output by the image encoder 506 (e.g., the vector 508 and the one or more intermediary vectors 510 whose dimensionality may have been modified to match the dimensionality of the output vector 518) and the second set of vectors 512 output by the text encoder 508 (e.g., vectors output by the text model for one or more tokens derived from the input text 504) are input into the vector combination module 514.

During operation 406 of method 400, the vector combination module 514 combines the first set of vectors and the second set of vectors 512 to create a vector output 515. In some embodiments, the vector combination module 514 implements an attention fusion module for flexible learning of nonlinear relationships between the input image 502 and the input text 504. It may be appreciated that any type of model or module may be used to process/combine the first set of vectors and the second set of vectors 512 to create the vector output 515. In some embodiments, the vector combination module 514 may utilize feed forward blocks and/or other functionality to generate an output that is related to the inputs (the first set of vectors and the second set of vectors 512) and context of the inputs (e.g., context of the input image 502 and the input text 504). In some embodiments, the vector combination module 514 generates a same number of outputs (vectors) as the number of inputs, and thus the vector output 515 may be generated as a vector average of the outputs of the vector combination module 514 so that the vector output 515 is a single vector. In this way, the vector output 515 takes into account both the output from the image encoder 506 (the vector 508 and the one or more intermediary vectors 510 of the first set of vectors), the output from the text encoder 508 (the second set of vectors 512), and relationships between the outputs to create the vector output 515.

During operation 408 of method 400, the final output vector combination module 516 applies a weight to the vector output 515 from the vector combination module 514 to create a weighted output. In some embodiments, the weight may be set to a value between 0 and 1. In some embodiments, the value may be initially set to a value between 0 and 0.1 or any other value (e.g., 0.01). During training, which will be subsequently described in greater detail, the value of the weight may be initially set low because the vector output from the vector combination module 514 may be relatively inaccurate and initially appear as noise, and thus the vector output is initially weighted low compared to the first set of vectors and the second set of vectors 512 so that the final output vector combination module 516 gives less weight/consideration to the relatively inaccurate vector output 515 from the vector combination module 514. As more vectors, output by the image encoder 506 and the text encoder 508 for subsequent input images and input text, are processed by the vector combination module 514, the subsequently created vector outputs may be more accurate. Accordingly, during training the value of the weight may be increased over time so that the increasingly accurate vector outputs are given more weight/consideration by the final output vector combination module 516.

During operation 410 of the method 400, the final output vector combination module 516 generates an output vector 518 based upon a combination of the first set of vectors (e.g., the vector 518, but not the one or more intermediary vectors 510), the second set of vectors 512, and the weighted output. The output vector 518 may comprise a vector with dimensions having values indicative of the input image 502 and the input text 504. In an example where the input image 502 depicts the bike with road tires and the input text 504 describes a modification of mud tires for the bike, the output vector 518 may comprise values for dimensions that can be used to query a catalog or other repository for content items associated with the bike equipped with the mud tires (e.g., a mud tire dimension and a bike dimension may be populated with large values).

The output vector 518 can be used by a content provider 530 to identify and provide content items over a network to remote computing devices for display to users such as through recommendations, text messages, emails, websites, apps, etc., as illustrated by FIG. 5B. For example, the content provider 530 may host a shopping website through which users can view and purchase products. A user of a computing device 534 may access the shopping website. The content provider 530 may determine that the user has an interest in bikes. The content provider 530 may utilize the output vector 518 associated with the input image 502 and the input text 504 relating to the bike in order to query 536 a catalog 532 of content items, during operation 412 of the method 400. The output vector 518 is used by the content provider 530 to query 536 the catalog 532 to identify a content item having a vector similar to the output vector 518 (e.g., a content item depicting a product, logo, building, entity, or something else having features/properties/characteristics similar to values of dimensions within the output vector 518), such as the bike equipped with the mud tires. For example, a distance in vector space between the output vector 518 and vectors of the content items in the catalog 532 may be compared to identify a content item 538 having a vector with a smallest distance to the output vector 518 in vector space. In this way, the content provider 530 may retrieve the content item 538 from the catalog 532, and transmit the content item 538 (e.g., an image depicting the bike equipped with the mud tires) over a network to the computing device 534 for display through the shopping website to the user.

In some embodiments, the image model of the image encoder 506, the text model of the text encoder 508, and/or the vector combination module 514 may be trained. The training may utilize labeled triples. A labeled triple may correspond to an image (e.g., an image of a scarf), modifying text (e.g., a caption describing the scarf in a different fabric), and a target image satisfying a query based upon the image and the modifying text (e.g., an image of the scarf in the different fabric). An output of a loss function processing the labeled triples may be used to determine a gradient. The gradient is used to update model weights of the image model of the image encoder 506, the text model of the text encoder 508, and/or the vector combination module 514. In this way, the precisions of the image model of the image encoder 506, the text model of the text encoder 508, and/or the vector combination module 514 may be increased. As the precision of the vector combination module 514 increases, the value of the weight applied to subsequent vector outputs of the vector combination module 514 is increased.

Figure 6A:
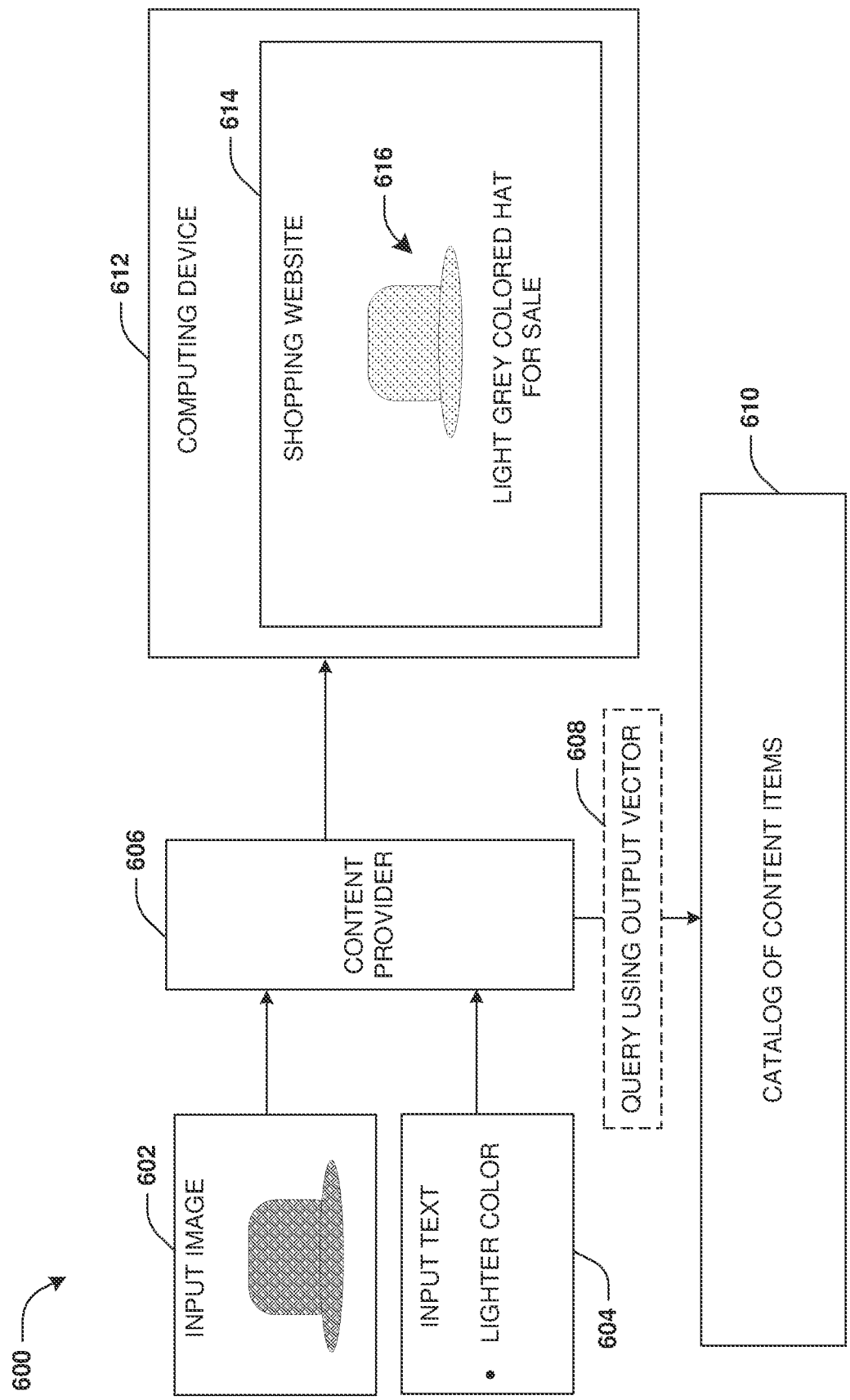
FIG. 6A is a component block diagram illustrating an example system for combining vectors output by multiple different mechanisms for content item retrieval.

FIG. 6A illustrates an embodiment of combining vectors output by multiple different mechanisms for content item retrieval. A content provider 606 may implement an image encoder, a text encoder, a vector combination module, and/or a final output vector combination module for identifying and displaying content items through computing devices. The content provider 606 may utilize the image encoder to process an input image 602 depicting a hat with a dark color. The image encoder may output a first set of vectors generated by an image model used by the image encoder to process the input image 602. The first set of vectors may include a vector (e.g., a final vector output by the image model) and one or more intermediary vectors generated by the image model. The first set of vectors may comprise dimensions with values set to indicate how much the input image 602 (the hat with the dark color) corresponds to features/properties/characteristics of each dimension.

The content provider 606 may utilize the text encoder to process input text 604 comprising a caption of the input image 602. The caption may describe how the hat comes in the lighter color. The text encoder may output a second set of vectors generated by a text model used by the text encoder to process the input text 604. The second set of vectors may include vectors generated by the image model for one or more tokens (e.g., strings of characters) derived from the input text 604. The second set of vectors may comprise dimensions with values set to indicate how much the input text 604 (the hat with the lighter color) corresponds to features/properties/characteristics of each dimension.

The content provider 606 may utilize a vector combination component to generate a vector output by combining the first set of vectors and the second set of vectors. A final output vector combination module may apply a weight to the vector output to create a weighted output. The final output vector combination module may generate an output vector based upon a combination of the first set of vectors (e.g., excluding any intermediary vectors), the second set of vectors, and the weighted output. The content provider 606 may query 608 a catalog 610 of content items using the output vector to retrieve a content item 616 having a vector with dimensions populated with values similar to the output vector. For example, distances between the output vector and vectors of the content items within the catalog 610 may be determined, and the content item 616 may be retrieved by the query 608 based upon the vector of the content item 616 having a shortest distance in vector space with respect to the output vector. The content item 616 may comprise an image depicting a light grey colored hat for sale. The content provider 606 may populate a shopping website 614 with the content item 616. A computing device 612 may access the shopping website 614 such that the content item 616 is displayed through the computing device 612 to a user.

Figure 6B:
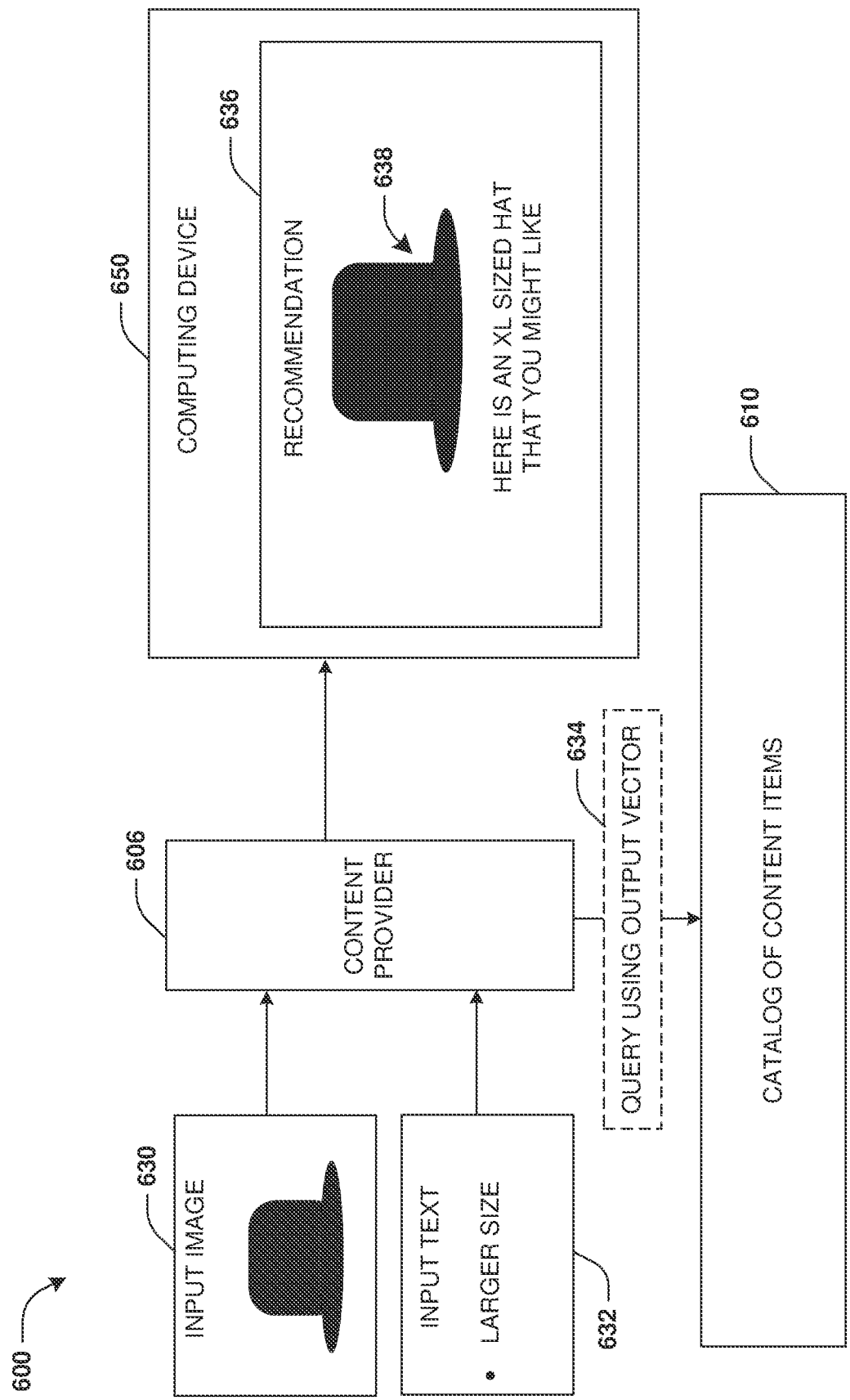
FIG. 6B is a component block diagram illustrating an example system for combining vectors output by multiple different mechanisms for content item retrieval.

FIG. 6B illustrates an embodiment of combining vectors output by multiple different mechanisms for content item retrieval. The content provider 606 may utilize the image encoder to process an input image 630 depicting a hat with a dark color. The image encoder may output a first set of vectors generated by an image model used by the image encoder to process the input image 630. The first set of vectors may include a vector (e.g., a final vector output by the image model) and one or more intermediary vectors generated by the image model. The first set of vectors may comprise dimensions with values set to indicate how much the input image 630 (the hat with the dark color) corresponds to features/properties/characteristics of each dimension.

The content provider 606 may utilize the text encoder to process input text 604 comprising a caption of the input image 630. The caption may describe how the hat comes in a larger size. The text encoder may output a second set of vectors generated by a text model used by the text encoder to process the input text 632. The second set of vectors may include vectors generated by the image model for one or more tokens (e.g., strings of characters) derived from the input text 632. The second set of vectors may comprise dimensions with values set to indicate how much the input text 632 (a larger size of the hat) corresponds to features/properties/characteristics of each dimension.

Figure 6C:
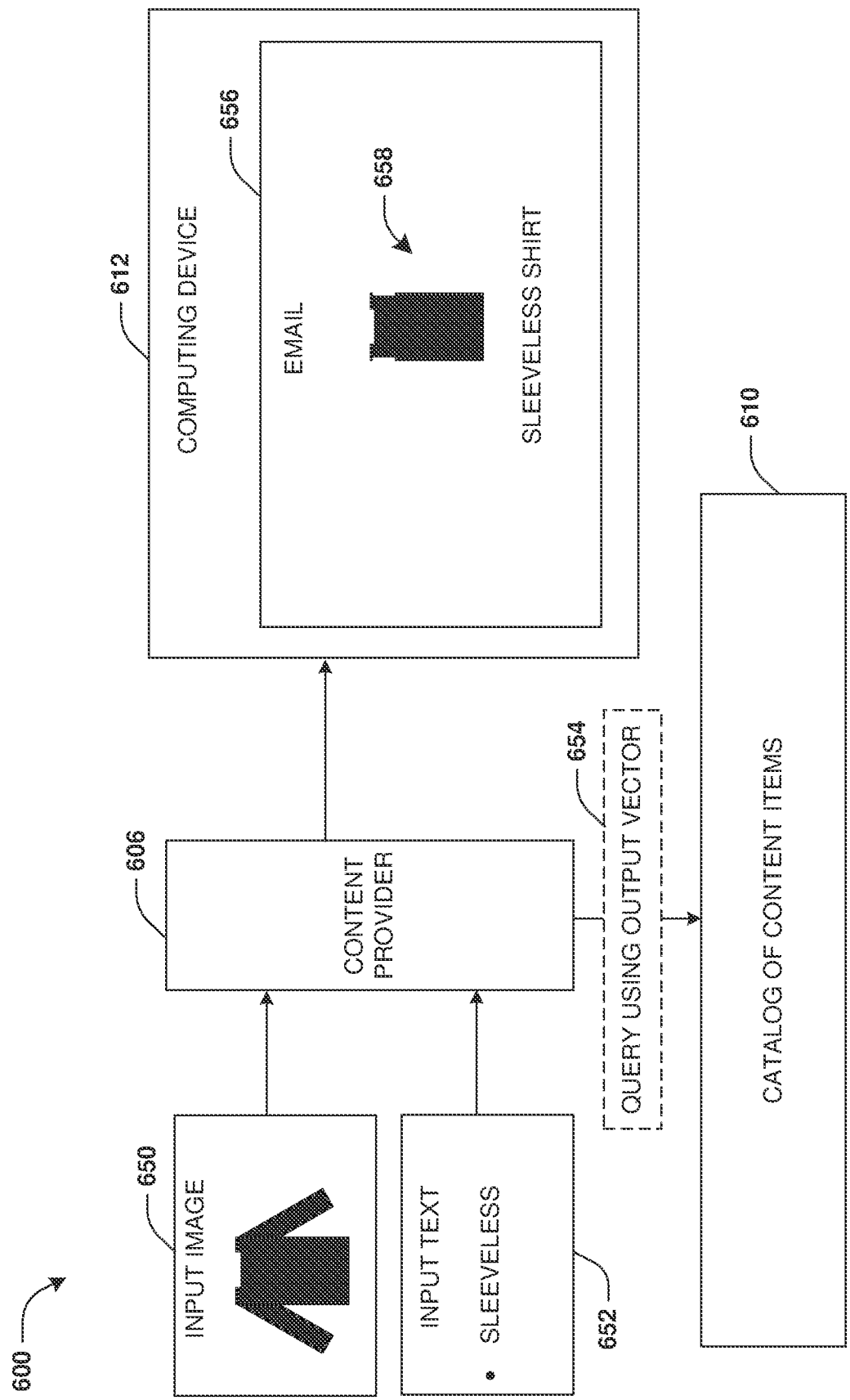
FIG. 6C is a component block diagram illustrating an example system for combining vectors output by multiple different mechanisms for content item retrieval.

The content provider 606 may utilize a vector combination component to generate a vector output by combining the first set of vectors and the second set of vectors. A final output vector combination module may apply a weight to the vector output to create a weighted output. The final output vector combination module may generate an output vector based upon a combination of the first set of vectors (e.g., excluding any intermediary vectors), the second set of vectors, and the weighted output. The content provider 606 may query 634 the catalog 610 of content items using the output vector to retrieve a content item 638 having a vector with dimensions with values similar to the output vector, as illustrated by FIGS. 6B and 6C. For example, distances between the output vector and vectors of the content items within the catalog 610 may be determined, and the content item 638 may be retrieved by the query 634 based upon the vector of the content item 638 having a shortest distance in vector space with respect to the output vector. The content item 638 may comprise an image depicting an XL sized hat. The content provider 606 may populate a recommendation 636 with the content item 638, which may be transmitted over a network to and displayed through a computing device 650, and may populate an email 656 with a sleeveless shirt recommendation 658, as illustrated by FIG. 6C.

In some embodiments, the techniques described herein are implemented to improve the performance of text guided image retrieval models, such as mechanisms for fusing text and image features. For an (image, text) input (x, t), these models compute a joint image-text embedding v=f(gI(x), gT(t))(1). An image backbone model gI is pretrained on a visual task such as ImageNet classification and the text backbone model gT (t) is pretrained separately on a text task such as masked language modeling. The simplest fusion function f is to add embeddings from each modality: vVA=gI(x)+gT(t). A baseline model may be the smallest available CLIP model together with this vector addition (VA) mechanism. Thus gI and gT are respectively an image model and a text model that have been trained to coordinate with one another. This pretrained cooperation between gI and gT leads to strong performance. Thus, any fusion mechanism should be tailored to not disrupt the alignment/coordination of these single-modality models. Accordingly, residual attention fusion (RAF) is provided as vRAF=gI(x)+gT (t)+ αfAF([ğI (x), ğT(t)]), where fAF is a Transformer attention block acting on the concatenation of image and text sequences ğI(x) and ğT(t), and a weight α=0.01 ensures that the model starts close to the powerful baseline. This allows the flexibility of attention fusion while preserving the pretrained alignment of the single-modality embeddings (e.g., the text model and the image model). Thus, the model can benefit from CLIP being trained on a huge dataset where the image and text are aligned, while also gaining flexibility in fine-tuning to a specific task and domain.

The text sequence for the attention fusion inputs consists of the features corresponding to each token after CLIP's Transformer text model. The image sequence includes a 7×7 top-level feature map flattened to 49 vectors, to which this technique appends the "attention pool" output of CLIP's modified architecture for an image sequence of length 50. This technique can be used by systems that can retrieve from a sizeable catalog based on a novel query. Accordingly, this technique evaluates models in a framework where an embedding is computed once for each catalog image and the technique retrieves from the catalog based on the dot products sq,c between an embedding for a query q and each catalog item c. The catalog embeddings are obtained using the same method as the query embeddings but with no text input. All embeddings are normalized so ranking by dot product is equivalent to using cosine similarity.

Figure 7:
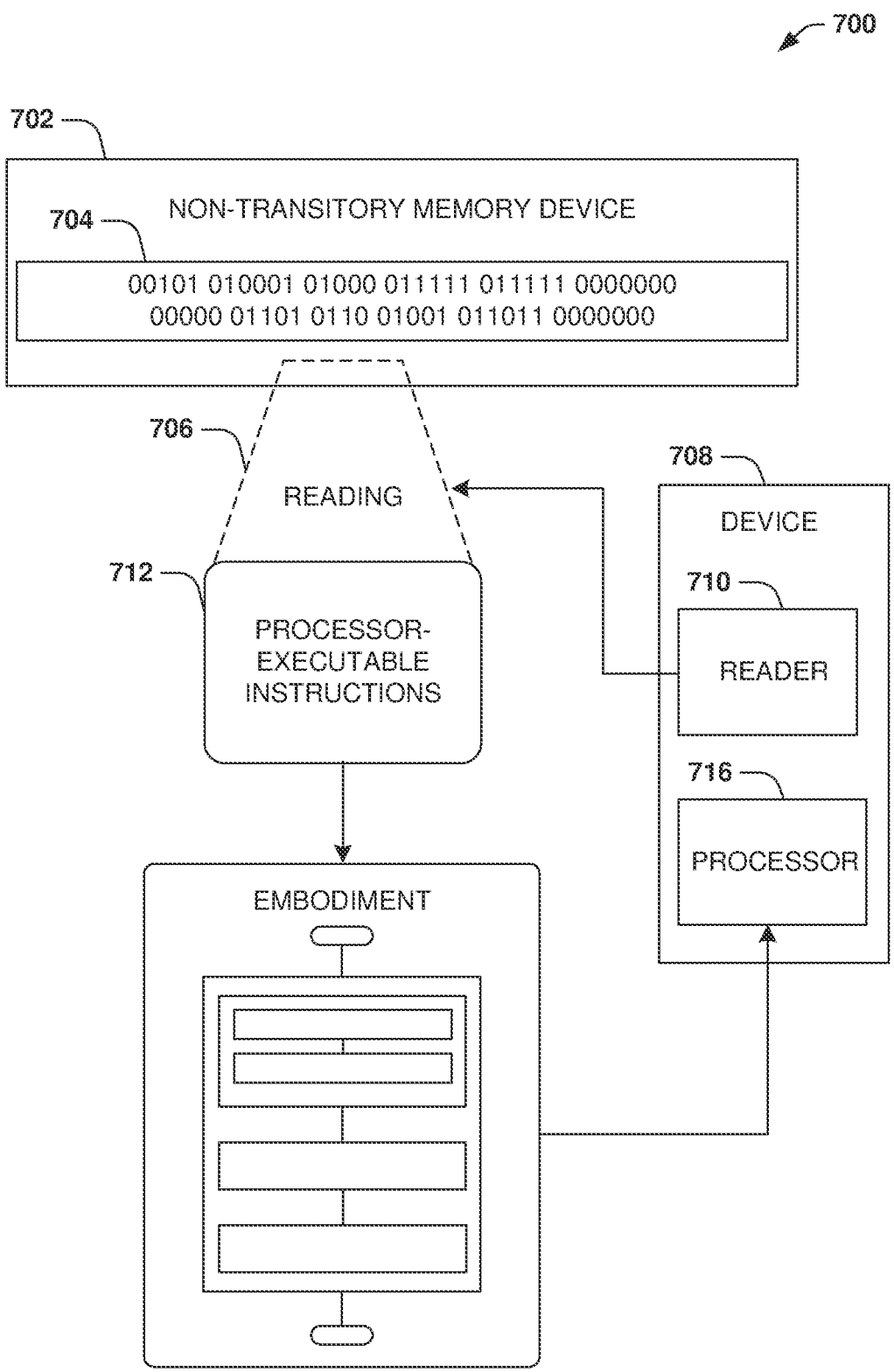
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIGS. 5A and 5B and/or at least some of the example system 600 of FIGS. 6A-6C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
generating, using an image encoder, a first set of vectors generated by an image model using an input image of a first object as input;
generating, using a text encoder, a second set of vectors generated by a text model using input text of a modification to the first object in the input image as input;
combining, using a vector combination module, (i) the first set of vectors of the input image of the first object and (ii) the second set of vectors of the input text of the modification to the first object to create a vector output;
applying a weight to the vector output to create a weighted output;
generating an output vector based upon a combination of the first set of vectors, the second set of vectors, and the weighted output;
using the output vector to determine a modified object indicative of the first object in the input image being modified by the input text; and
providing a content item comprising the modified object to a device for display.

2. The method of claim 1, comprising:
generating the first set of vectors to include a second output vector from the image model and one or more intermediary vectors from the image model.

3. The method of claim 2, comprising:
applying a matrix of learned parameters to the one or more intermediary vectors to modify a dimensionality of the one or more intermediary vectors to match a dimensionality of the second output vector from the image model.

4. The method of claim 1, comprising:
generating the second set of vectors to include vectors generated from tokens derived from the input text.

5. The method of claim 1, comprising:
implementing residual attention fusion (RAF) for flexible learning of nonlinear relationships between the input image and the input text, wherein the RAF fine-tunes an RAF enhanced model by performing transfer learning.

6. The method of claim 1, comprising:
setting the weight to a value between 0 and 1, wherein the value is initially set to a value between 0 and 0.1.

7. The method of claim 1, wherein the output vector is generated with the vector output being given less weight than the first set of vectors and the second set of vectors.

8. The method of claim 1, comprising:
training the image model, the text model, and the vector combination module using a gradient to update model weights of the image model, the text model, and the vector combination module.

9. The method of claim 8, wherein the training utilizes labeled triples, wherein a labeled triple corresponds to an image, modifying text, and a target image satisfying a query corresponding to the image and modifying text.

10. The method of claim 8, wherein the gradient is determined based upon an output of a loss function.

11. The method of claim 1, comprising:
iteratively increasing a value of the weight applied to subsequent vector outputs of the vector combination module.

12. The method of claim 1, wherein the input image corresponds to a first product, the input text corresponds to a description of the first product, and the content item corresponds to a second product related to the first product.

13. The method of claim 12, wherein the description corresponds to a modification of the first product, and wherein the second product relates to the modification of the first product.

14. A non-transitory machine readable medium having stored thereon processor-executable instructions that when executed cause performance of operations, the operations comprising:
generating, using an image encoder, a first set of vectors generated by an image model using an input image of a first object as input;
generating, using a text encoder, a second set of vectors generated by a text model using input text of a modification to the first object in the input image as input;
combining, using a vector combination module, (i) the first set of vectors of the input image of the first object and (ii) the second set of vectors of the input text of the modification to the first object to create a vector output;
applying a weight to the vector output to create a weighted output;
generating an output vector based upon a combination of the first set of vectors, the second set of vectors, and the weighted output;
using the output vector to determine a modified object indicative of the first object in the input image being modified by the input text; and
displaying a content item comprising the modified object.

15. The non-transitory machine readable medium of claim 14, wherein the operations comprise:
generating the first set of vectors to include a second output vector from the image model and one or more intermediary vectors from the image model.

16. The non-transitory machine readable medium of claim 15, wherein the operations comprise:
applying a matrix of learned parameters to the one or more intermediary vectors to modify a dimensionality of the one or more intermediary vectors to match a dimensionality of the second output vector from the image model.

17. The non-transitory machine readable medium of claim 14, wherein the operations comprise:
generating the second set of vectors to include vectors generated from tokens derived from the input text.

18. A computing device comprising:
a processor; and
memory comprising processor-executable instructions that when executed by the processor cause performance of operations, the operations comprising:
generating, using an image encoder, a first set of vectors generated by an image model using an input image of a first object as input;

generating, using a text encoder, a second set of vectors generated by a text model using input text of a modification to the first object in the input image as input;

combining, using a vector combination module, (i) the first set of vectors of the input image of the first object and (ii) the second set of vectors of the input text of the modification to the first object to create a vector output;

applying a weight to the vector output to create a weighted output;

generating an output vector based upon a combination of the first set of vectors, the second set of vectors, and the weighted output;

using the output vector to determine a modified object indicative of the first object in the input image being modified by the input text; and providing a content item comprising the modified object to a device for display.

19. The computing device of claim 18, wherein the operations comprise:

generating the first set of vectors to include a second output vector from the image model and one or more intermediary vectors from the image model.

20. The computing device of claim 18, wherein the operations comprise:

generating the second set of vectors to include vectors generated from tokens derived from the input text.

* * * * *